(12) United States Patent
Ryman

(10) Patent No.: US 11,927,406 B2
(45) Date of Patent: Mar. 12, 2024

(54) CONNECTOR ASSEMBLY, PLATE FOR USE WITH SUCH AN ASSEMBLY AND A COOLING SYSTEM INCLUDING SUCH AN ASSEMBLY

(71) Applicant: Oetiker Schweiz AG, Horgen (CH)

(72) Inventor: Morgan Ryman, Anderstorp (SE)

(73) Assignee: Oetiker Schweiz AG, Horgen (CH)

(*) Notice: Subject to any disclaimer, the term of this patent is extended or adjusted under 35 U.S.C. 154(b) by 371 days.

(21) Appl. No.: 17/297,480

(22) PCT Filed: Nov. 29, 2018

(86) PCT No.: PCT/EP2018/083067
§ 371 (c)(1),
(2) Date: May 27, 2021

(87) PCT Pub. No.: WO2020/108763
PCT Pub. Date: Jun. 4, 2020

(65) Prior Publication Data
US 2022/0003510 A1 Jan. 6, 2022

(51) Int. Cl.
*F28F 9/02* (2006.01)
*F16L 41/08* (2006.01)
*F16L 47/28* (2006.01)

(52) U.S. Cl.
CPC ............ *F28F 9/0258* (2013.01); *F16L 41/08* (2013.01); *F16L 47/28* (2013.01); *F28F 9/0248* (2013.01)

(58) Field of Classification Search
CPC ......... F16L 41/08; F16L 41/007; F16L 41/04; F16L 41/001; F16L 41/088; F16L 47/28;
(Continued)

(56) References Cited

U.S. PATENT DOCUMENTS 4,379,574 A * 4/1983 Leichtl .................. F28F 9/0248
5,368,340 A * 11/1994 Jacobson ................ F16L 47/28
(Continued)

FOREIGN PATENT DOCUMENTS

DE 1401701 A1 4/1969
EP 192524 A * 8/1986 ............ F16L 37/008
(Continued)

OTHER PUBLICATIONS

EP-192524-A—Machine Translation—English (Year: 1986).*
(Continued)

*Primary Examiner* — William S. Cho
(74) *Attorney, Agent, or Firm* — David L. Nocilly; Bond, Schoeneck & King PLLC

(57) ABSTRACT

A connector assembly including a plate (10) having an orifice (10a) and a spigot (12), the spigot (12) having an internal flow path for liquid, and connector means (14) for connecting the spigot (12) to the metal plate (10) so as to guide the liquid flowing in the flow path through the orifice (10a), the connector (14) including a protruding collar structure (16) surrounding the orifice (10a).
The connector means (14) further includes a ring-shaped snap-on module (18) configured to be fitted over the collar structure (16), the snap-on module (18) including a cylindrical insertion part (18a) configured to be inserted into an orifice (10a) of the collar structure (16), wherein a remote end of the cylindrical insertion part (18a) in the insertion direction is provided with first snap-on structures engaging with the collar structure (16).

14 Claims, 4 Drawing Sheets

(58) Field of Classification Search
CPC . F16L 47/26; F16L 37/008; F16L 5/02; F16L 5/027; F28F 9/0258; F28F 9/0248
See application file for complete search history.

(56) References Cited

U.S. PATENT DOCUMENTS 6,053,537 A * 4/2000 Guest .................... F16L 41/088
2004/0083884 A1 5/2004 Faller

FOREIGN PATENT DOCUMENTS

FR        2859010 A1    2/2005
JP        S5877720 A    5/1983

OTHER PUBLICATIONS

International Search Report Form PCT/ISA/210, and Written Opinion Form PCT/ISA/237, International Application No. PCT/EP2018/083067, pp. 1-18 International Filing Date Nov. 29, 2018.

* cited by examiner

CONNECTOR ASSEMBLY, PLATE FOR USE WITH SUCH AN ASSEMBLY AND A COOLING SYSTEM INCLUDING SUCH AN ASSEMBLY

CROSS-REFERENCE TO RELATED APPLICATIONS

The present application is a US national phase of PCT Application No. PCT/EP2018/083067, filed on Nov. 29, 2018, the disclosure of which is incorporated herein by reference in its entirety.

TECHNICAL FIELD

The invention relates to a flow connector assembly for liquid flows, for example for cooling liquids.

BACKGROUND OF THE INVENTION

It is known to guide liquids through tubes or hoses. In order to create a flow-path connection between a container or other kinds of receptacle and the tube or hose, it is known to attach a spigot to the wall or the container or receptacle. The container wall is provided with an orifice and the spigot is inserted into- or attached to the orifice. The mechanical connection between the spigot and the wall should be sufficiently robust to withstand the forces to be expected and to be sealed. In the case of walls made of sheet metal, this is usually achieved by welding, soldering or brazing a protruding socket or male connector part onto the metal sheet. The spigot is then mounted to the socket or connected with the connector part.

The mounting normally requires tools, e.g. for screwing to generate a sufficient contact pressure for sealing the connection. This is burdensome and a source of potential errors.

BRIEF SUMMARY OF THE INVENTION

The invention seeks to overcome these problems by providing a compact, light and easy to use connector assembly, plate for use with such an assembly and a cooling system including such an assembly.

This object is achieved by a connector assembly according to claim 1, a plate for use with such an assembly and a cooling system including such an assembly. Preferred embodiments of the invention are set out in the dependent claims.

The invention relates to a connector assembly, for example for coolants or cooling liquids, including a plate having an orifice and a spigot, said spigot having an internal flow path for liquid, and connector means for connecting the spigot to the metal plate so as to guide the liquid flowing in the flow path through the orifice, said connector means including a protruding collar structure surrounding the orifice.

It is proposed that the connector means further includes a ring-shaped snap-on module configured to be fitted over the collar structure, said snap-on module including a cylindrical insertion part configured to be inserted into an orifice of said collar structure, wherein a remote end of the cylindrical insertion part in the insertion direction is provided with first snap-on structures engaging with the collar structure. The snap-on module enables an easy assembly even without tools while providing a reliable, robust and precise connection structure for the spigot.

The invention, in particular in the embodiment with the snap-on module, lends itself in particular to applications where the spigot has to be mounted from the outside of the container or receptacle if there is no possibility reach the inside thereof.

In a preferred embodiment of the invention, said collar structure is integrally made of the sheet metal of said sheet metal plate by a sheet metal forming process and in that a male end of said spigot is configured to be inserted in said collar structure and locked in place by interacting with said connector means. By forming the collar structure integrally with the sheet metal plate using sheet metal forming process, additional manufacturing steps including brazing or welding can be avoided and the manufacturing process can be simplified. The collar structure his very rigid and virtually impossible to break off. The structure itself forms a reinforcing rib. Impurities resulting from brazing or welding-processes or leakage due to imperfect welding can be avoided.

The sheet metal forming process may include different techniques such as stamping, deep-drawing, punching, blanking, stamping, embossing, bending, forming, tap extrusion or coil extrusion, optionally complemented by laser cutting. According to further embodiments of the invention, the collar could be formed by 3D-printing, molding or casting.

It is further proposed the cylindrical inner wall of the insertion part of the ring-shaped snap-on module is provided a notch configured to receive an O-ring. The first O-ring can provide a reliable sealing between the inner wall of the orifice in the snap-on module and the outer wall of the male end of the spigot.

According to further embodiments of the invention, an inner circumference of the collar structure includes a structure such as a notch or a flange configured to support a second O-ring to be arranged between collar structure and the outer wall of the insertion part. The second O-ring can ensure a reliable sealing between the snap-on module and the collar structure.

The inventor further proposes that the ring-shaped snap-on module further includes an outer wall surrounding said collar structure and a second O-ring provided in a gap between the outer wall of the snap-on module and the collar structure. The second O-ring can ensure a reliable sealing between the snap-on module and the collar structure. The O-ring on the inner side of the collar structure and the O-ring on the outer side of the collar structure may be used alone or in combination.

In a preferred embodiment of the invention, the ring-shaped snap-on module is a plastic part. This is a light, cost-saving and reliable solution. The plastic can be chosen according to the chemical and thermal requirements imposed by the application and may include fibre reinforcement or metal reinforcement if necessary.

In a preferred embodiment of the invention, the collar structure is a cylindrical double layer structure obtained by folding the sheet metal back, the rim of the sheet metal being arranged on the inside of the collar structure. The rim may then be used as a stable, sharp and well-defined engagement point for latching structures of the spigot or of the ring-shaped snap-on module.

It is further proposed that the male end of said spigot includes at least one latching structure on a radial outside surface of its end portion, said latching structures being configured to interact with corresponding latching structures on a cylindrical inner surface of said connector means. This enables an easy and simple snap-on assembly of the spigot without requiring special tools.

According to one embodiment of the invention, the latching structure on the radial outside surface of the end portion of the spigot is configured to engage around a rim of the cylindrical inner surface of said connector means. In a preferred embodiment of the invention, the cylindrical inner surface of said connector means is a cylindrical inner surface of said ring-shaped snap-on module. By insertion and latching of the spigot into the snap-on module, the module is firmly secured towards the collar structure and the snap-on module is locked in place.

It should be noted that both the snap-on connection between the snap-on module and the collar structure and the snap-on connection between the spigot and the snap-on module may be releasable, e.g. by rotating the spigot and the snap-on module or other elements against each other. In this case, the collar and/or the snap-on module may have a segmented shape such that the connection can be released by aligning the appropriate segments.

A further aspect of the invention relates to a cooling plate, heat exchanger or battery plate assembly including a sheet metal plate with a collar structure suitable for use in a connector assembly as defined above.

A yet further aspect of the invention relates to a cooling system, in particular for battery assemblies, including a connector assembly as defined above.

Further features and advantages of the invention can be derived from the following description of the embodiments of the invention. The specification as a whole, the claims and the figures disclose features of the invention in specific combinations. The skilled person will consider these features in isolation and combine them to obtain further combinations or sub-combinations thereof in order to adapt the invention as defined in the claims to his specific needs.

DETAILED DESCRIPTION OF THE EMBODIMENTS

Figure 1:
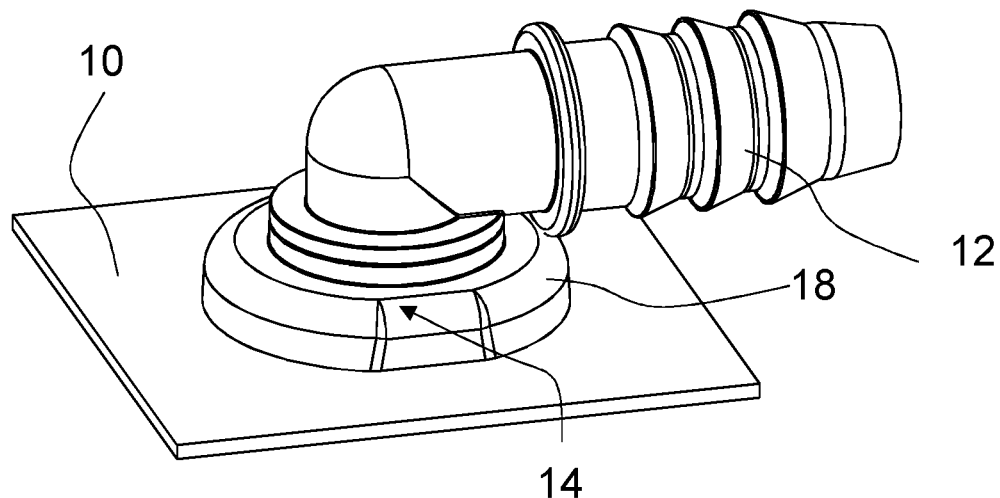
FIG. 1 shows connector assembly according to a first embodiment of the invention.
Figure 3:
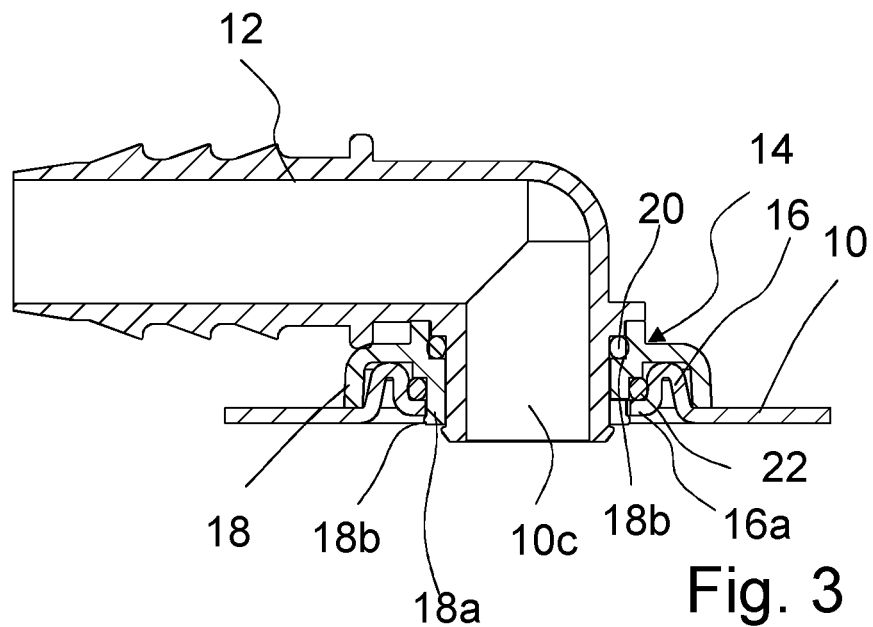
FIG. 3 is a sectional view of the connector assembly according to the first embodiment of the invention.

FIGS. 1 and 3 show a connector assembly according to a first embodiment of the invention. The connector assembly is configured for use in a battery cooling system of an electric or hybrid vehicle and guides the cooling liquid to a heat exchanger. One of the walls of the heat exchanger is a sheet metal plate 10 having an orifice 10a and a spigot 12 to be attached to the orifice 10a. The spigot 12 has an internal, angular flow path for liquid, e.g. coolant or water ending in an orifice 10c arranged within the orifice 10a. Connector means 14 are provided for connecting the spigot 12 to the metal plate 10 so as to guide the liquid flowing in the flow path through the orifice 10c. The connector means 14 include a protruding collar structure 16 surrounding the orifice 10a.

Figure 2:
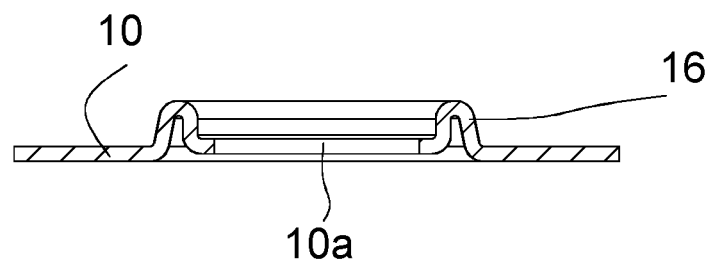
FIG. 2 illustrates a sheet metal plate including a collar structure according to the first embodiment of the invention.

As illustrated in FIG. 2 the collar structure 16 is integrally made of the sheet metal of said sheet metal plate 10 by a sheet metal forming process such as punching and deep-drawing. The circular cylindrical collar structure 16 protrudes from the sheet metal plate 10 as a roughly cylinder-barrel shaped circular wall in a direction perpendicular to a main plane or tangential plane of the sheet metal plate 10.

The collar structure 16 lends stability to the connection between the spigot 12 and the sheet metal plate 10 and stabilizes the rim of the orifice 10a provided in the centre of the collar structure 16. In the embodiment of FIGS. 1-3, the collar structure 16 has double layer structure obtained by folding the sheet metal back, the rim of the sheet metal being arranged on the inside of the collar structure 16.

The connector means 14 further includes a ring-shaped snap-on module 18 formed as an injection-moulded plastic part configured to be fitted over the collar structure 16. The snap-on module 18 includes a cylindrical insertion part 18a configured to be inserted into an orifice 10a of said collar structure 16, wherein a remote end of the cylindrical insertion part 18a in the insertion direction is provided with a plurality of latches 18b with snap-fitting protrusions protruding radially outward as first snap-on structures engaging with the lower rim of the collar structure 16. When inserting the cylindrical insertion part 18a into the orifice 10a of the collar structure 16, the latches 18b are deflected radially inward and snap back upon reaching the final engagement position.

The cylindrical inner wall of the insertion part 18a of the ring-shaped snap-on module 18 is provided with a notch 18c configured to receive a first O-ring 20.

A male end of the spigot 12 is configured to be inserted into an orifice 10b of the ring-shaped snap-on module 18 and thus into the collar structure 16 and locked in place by interacting with the connector means 14. A flange 28 of the spigot limits the depth of its insertion into the snap-on module 18. The inward deflection of the latches 18b is blocked by the spigot. The male end of said spigot 12 includes a plurality latching structures on a radial outside surface of its end portion, the latching structures being configured to engage with the lower rim, latches or other mating structures of the cylindrical inner surface of the ring-shaped snap-on module 18. As illustrated in FIG. 3, the latching ends of the spigot 12 protrude slightly over the inner (lower) surface of the snap-on module 18.

The ring-shaped snap-on module 18 further includes an outer wall surrounding the collar structure 16 and abutting to the radially outer wall of the collar structure 16 such that the overall profile of the ring-shaped snap-on module 18 is that of a reverse U-shape clipped onto the collar structure 16.

A second O-ring 22 sealing the connection between the snap-on module 18 and the metal plate 10 is arranged on an inner circumference of the collar structure 16, wherein the latter includes a flange 16a protruding radially inward configured to support the second O-ring 22 arranged between collar structure 16 and the outer wall of the insertion part 18a.

The remote end of the spigot 12 is configured with a barb structure fitting into a coolant hose, which may for example be further fixed by a hose clamp. However, the structure of the remote end of the spigot 12 is not particularly limited and may be of any structure suitable for connecting hoses or tubes.

Figure 4:
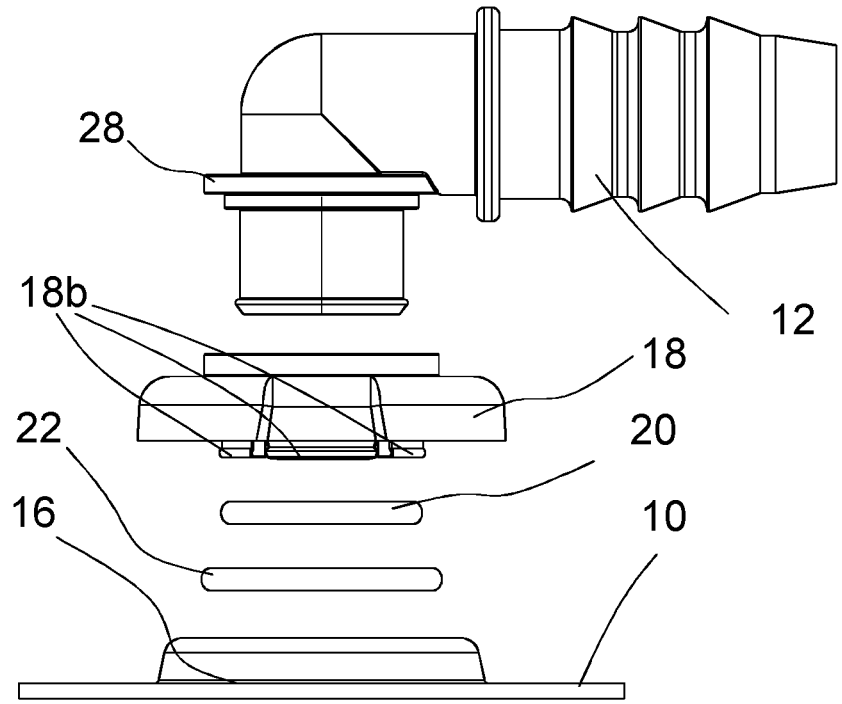
FIG. 4 is an explosion view of the connector assembly according to the first embodiment of the invention.

FIG. 4 is an explosion view of the connector assembly including the spigot 12, the snap-on module 18, the first O-ring 20 sealing the connection between spigot 12 and snap-on module 18 and the second O-ring 22 sealing the connection between the snap-on module 18 and the metal plate 10.

Figure 5:
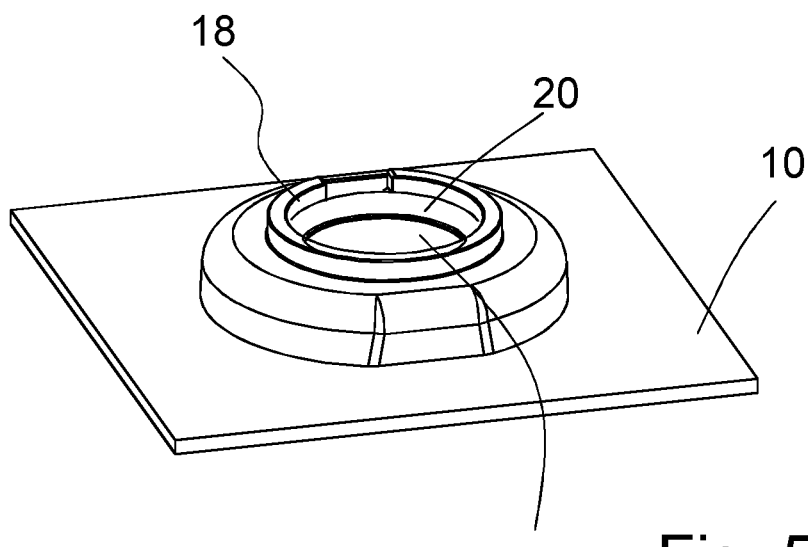
FIG. 5 illustrates a pre-assembled structure including a metal plate and a snap-on module according to the first embodiment of the invention.

The ring-shaped snap-on module 18 may be pre-assembled and snapped on the collar structure 16 of the metal plate 10 in an easily transportable unit without requiring special tools. The pre-assembled structure is illustrated in FIG. 5. The pre-assembled unit can be transported without risk of loss of the snap-on module 18 and the spigot 12 and a hose can then be attached in the final assembly of the application using the connector assembly.

The sheet metal plate 10 with the collar structure 16 is part of a cooling plate, heat exchanger or battery plate assembly but is not limited thereto. The invention can be applied to an easy connectable spigot 12 for all kinds of receptacles in any material.

The sheet metal plate 10 and the connector assembly are suitable for use in a cooling system, in particular for battery assemblies, for transporting cooling liquids.

FIGS. 6 to 9 show a second and third embodiment of the invention. In order to avoid repetitions, the following specification of these further embodiments is limited to differences to the first embodiment of the invention. Regarding the unchanged features, the skilled person is referred to the above specification of the first embodiment. The same reference signs are used for identical features of features having a similar effect in order to emphasize the similarities.

Figure 6:
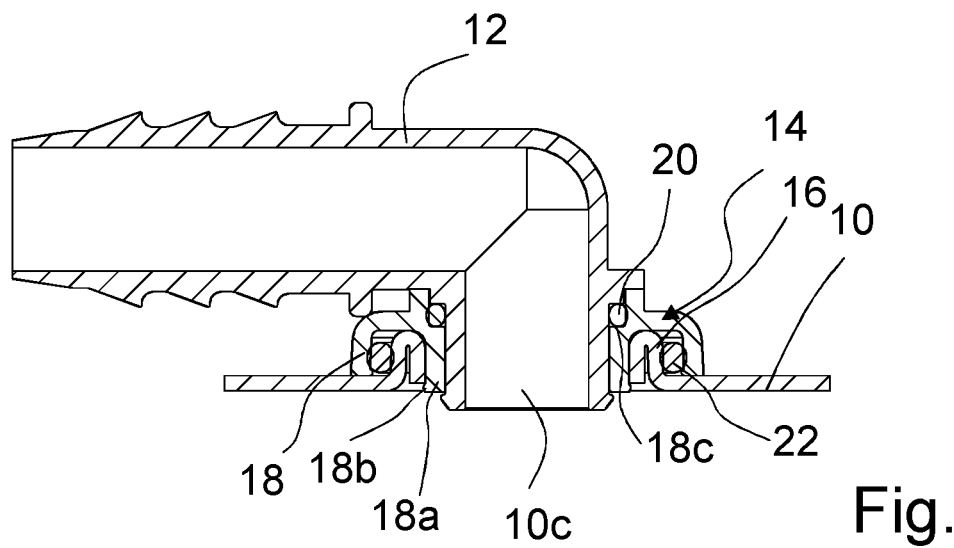
FIG. 6 is a sectional view of the connector assembly according to a second embodiment of the invention.
Figure 7:
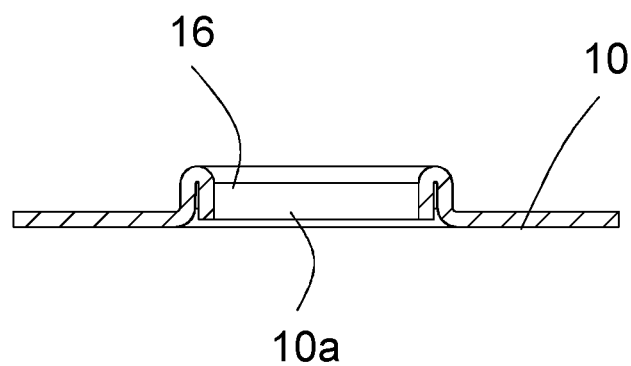
FIG. 7 illustrates a sheet metal plate including a collar structure according to the second embodiment of the invention.

In the second embodiment of the invention as shown in FIGS. 6 and 7, an O-ring 22 is provided in a gap between the outer wall and the collar structure 16 to seal the connection between the snap-on module 18 and the sheet metal plate 10. The flange on the inside of the collar structure 16 can be dispensed with in this embodiment.

Figure 8:
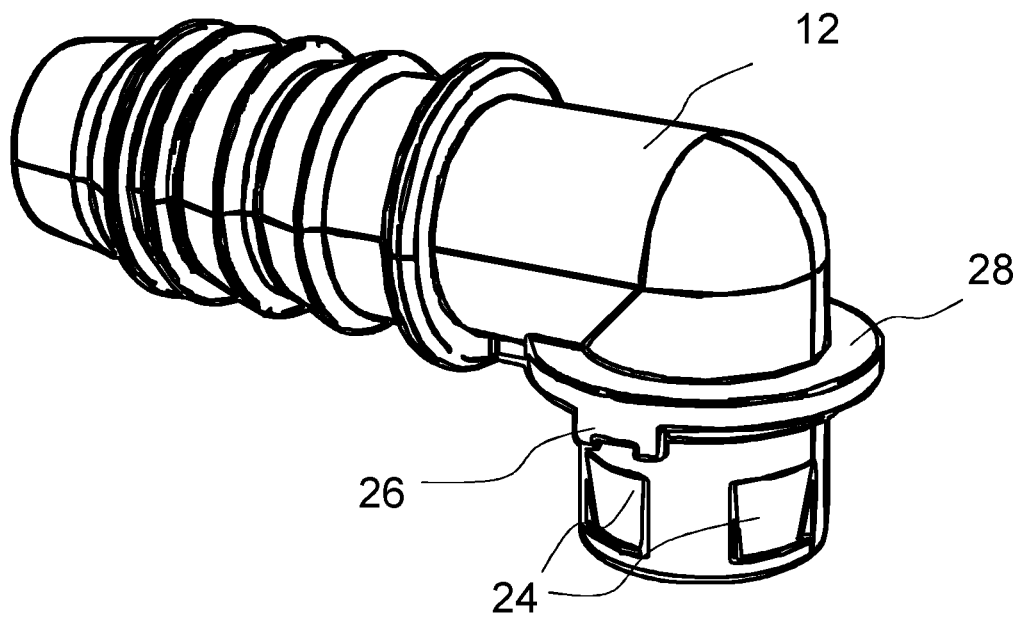
FIG. 8 illustrates a spigot of a connector assembly according to third embodiment of the invention.
Figure 9:
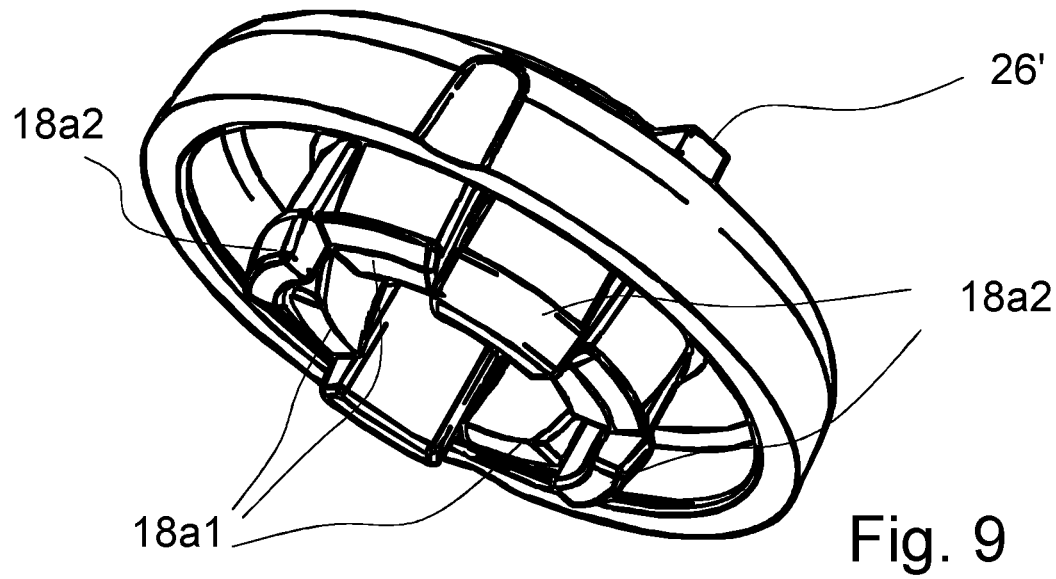
FIG. 9 illustrates a snap-on module according to the third embodiment of the invention.

FIGS. 8 and 9 illustrate a spigot 12 and a snap-on module of a connector assembly according to the third embodiment of the invention the end portion of the spigot 12 to be inserted into the orifice 10b of the snap-on module 18 is provided with recesses 24 accommodating inwardly protruding end portions of a subset of latches 18b1 of the snap-on module 18. A second subset of latches 18b2 engages radially outward with the orifice 10a of the sheet metal plate 10 (not illustrated). The limited width of the recesses 24 in the circumferential direction define the relative rotational position of the spigot 12 and the snap-on module 18, which is further defined by mating structures 26, 26' on an upper surface of the snap-on module 18 and on a flange 28 of the spigot 12.

The invention claimed is:
1. A connector assembly, comprising:
a metal plate (10) having an orifice (10a) and a spigot (12), said spigot (12) having an internal flow path for liquid, and connector means (14) for connecting the spigot (12) to the metal plate (10) so as to guide the liquid flowing in the flow path through said orifice (10a), said connector means (14) including a protruding collar structure (16) surrounding said orifice (10a), wherein a male end of said spigot (12) is configured to be inserted in said collar structure (16),
wherein the connector means (14) further includes a ring-shaped snap-on module (18) configured to be fitted over the collar structure (16), said snap-on module (18) including a cylindrical insertion part (18a) configured to be inserted into said orifice (10a) of said collar structure (16), wherein a remote end of the cylindrical insertion part (18a) in an insertion direction is provided with first snap-on structures engaging with the collar structure (16); and
a cylindrical inner wall of the insertion part (18a) of the ring-shaped snap-on module (18) is provided with a notch configured to receive a first O-ring (20).

2. The connector assembly according to claim 1, wherein said metal plate is a sheet metal plate (10) and wherein said collar structure is integrally made of the sheet metal of said sheet metal plate (10) by a sheet metal forming process.

3. The connector assembly according to claim 1, wherein an inner circumference of the collar structure (16) includes a structure configured to support an O-ring to be arranged between the collar structure (16) and the outer wall of the insertion part (18a).

4. The connector assembly according to claim 1, wherein the ring-shaped snap-on module (18) further includes an outer wall surrounding said collar structure (16) and a second O-ring (22) is provided in a gap between the outer wall and the collar structure (16).

5. The connector assembly according to claim 1, wherein the ring-shaped snap-on module (18) is a plastic part.

6. The connector assembly according to claim 1, wherein the collar structure (16) is a cylindrical double layer structure with a rim being arranged on an inside of the collar structure (16).

7. The connector assembly according to claim 6, wherein said metal plate is a sheet metal plate (10) and the cylindrical double layer structure is obtained by a fold in the sheet metal of the sheet metal plate (10).

8. The connector assembly according to claim 1, wherein the male end of said spigot (12) includes at least one latching structure on a radial outside surface, said at least one latching structure being configured to interact with the first snap-on structures on a cylindrical inner surface of said connector means (14).

9. The connector assembly according to claim 8, wherein said at least one latching structure on the radial outside surface of the end portion of the spigot (12) is configured to engage around a rim of a cylindrical inner surface of said connector means (14).

10. The connector assembly according to claim 9, wherein the cylindrical inner surface of said connector means (14) is a cylindrical inner surface of said ring-shaped snap-on module (18).

11. The connector assembly according to claim 1, wherein the first snap-on structures are configured to engage with a lower rim of the collar structure (16).

12. The connector assembly according to claim 1, wherein an engagement in the insertion direction is provided by the first snap-on structures of the cylindrical insertion part (18a) with the collar structure (16) and is locked by the insertion of said male end of said spigot (12).

13. A cooling plate, heat exchanger or battery plate assembly having a connector assembly according to claim 1.

14. A cooling system for battery assemblies, including a connector assembly according to claim 1.

* * * * *